May 16, 1961  J. H. BORN  2,984,733
DEVICE FOR WELDING WIRES TO TERMINALS
Filed Aug. 31, 1959  3 Sheets-Sheet 1
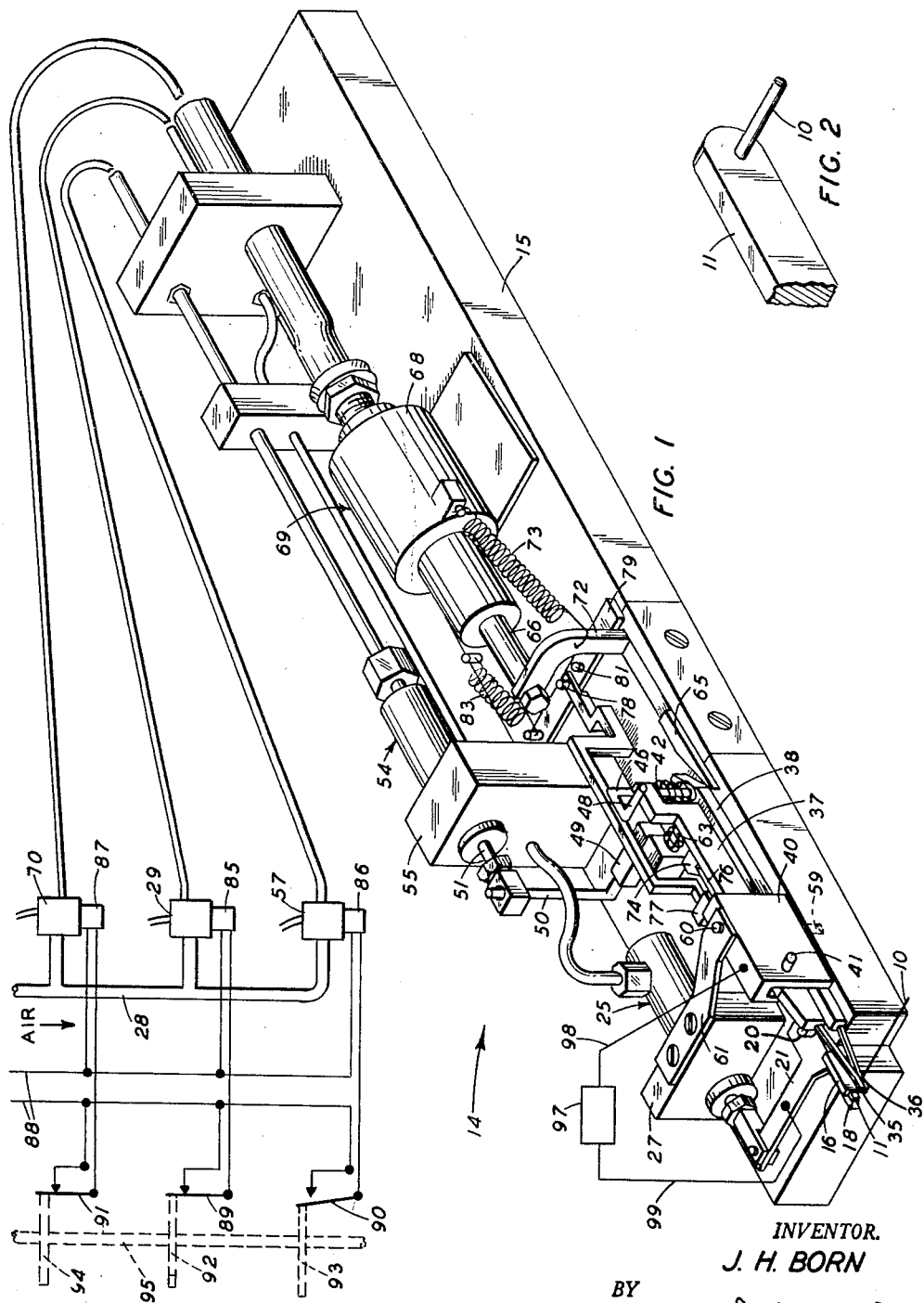
INVENTOR.
J. H. BORN
BY
a.C. Schwarz, Jr.
ATTORNEY

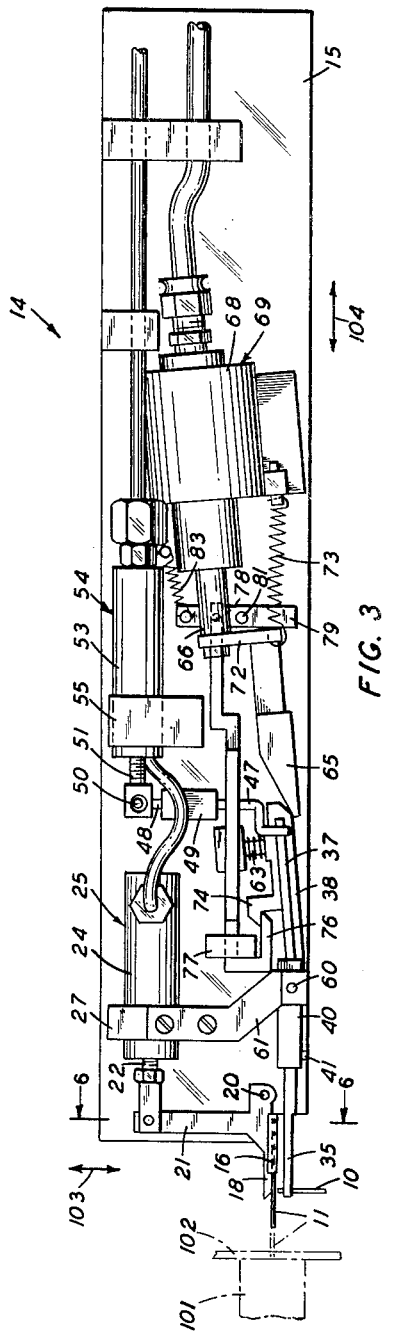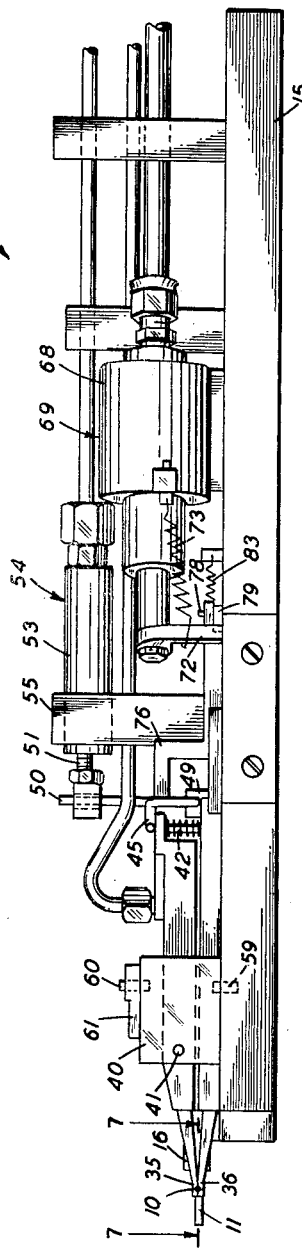

United States Patent Office 2,984,733
Patented May 16, 1961

2,984,733

DEVICE FOR WELDING WIRES TO TERMINALS

James H. Born, Lombard, Ill., assignor to Western Electric Company, Incorporated, New York, N.Y., a corporation of New York Filed Aug. 31, 1959, Ser. No. 837,107

2 Claims. (Cl. 219—78)

This invention relates to a device for welding wires to terminals and more particularly to a device having power actuated means for gripping the terminal and a wire and moving them into percussive engagement with each other while impressing a welding potential across them to effect the welding of the wire to the terminal.

An object of the present invention is to provide an improved device for welding wires to terminals.

Another object of the invention is the provision in a welding device of power-actuated means for gripping a terminal and a wire and moving them into percussive engagement with each other while impressing a potential across the terminal and the wire to effect the welding of the wire to the terminal.

With these and other objects in view, the invention contemplates the provision of a terminal holder or jaw fixedly mounted on a base for locating a terminal in a predetermined position, and a terminal-clamping jaw operated by a first air-operated actuator for clamping the terminal in the holder. A pair of levers having wire-gripping jaws at one end thereof are disposed one above the other with the upper lever pivotally supported on the lower and spring urged to a closed position to grip a wire between the wire-gripping jaws, and an actuating bail mounted on the base and operated by a second air-operated actuator serves to open the wire-gripping jaws. The levers are mounted on the base for pivotal movement together about a vertical axis to guide the wire-gripping jaws through a horizontal path toward and away from the holder, and the levers are spring stressed to move the wire-gripping jaws toward the terminal holder to carry the wire into engagement with the terminal.

A cam slidably mounted on the base is advanced by a third air-operated actuator to move the levers to a cocked position with the jaws spaced a predetermined distance from the terminal holder, and a latch is actuated in response to the advance movement of the cam to latch the levers in cocked position to permit the loading of wire into the wire-gripping jaws after which the third actuator returns and retracts the cam and actuates the latch to release the levers and effect the movement of the wire into percussive engagement with the terminal. During the movement of the wire, a welding potential impressed across the terminal and the wire-gripping jaws produces an arc and effects the welding of the wire to the terminal.

Other objects and advantages of the invention will become apparent by reference to the following detailed description thereof and the accompanying drawings illustrating a preferred embodiment of the invention in which:

Fig. 1 is a perspective view of the percussive-welding device embodying the present invention;

Fig. 2 is an enlarged fragmentary view of a terminal with a wire welded thereto;

Fig. 3 is a fragmentary plan view of the welding device;

Fig. 4 is a side view of the welding device;

Figure 5:
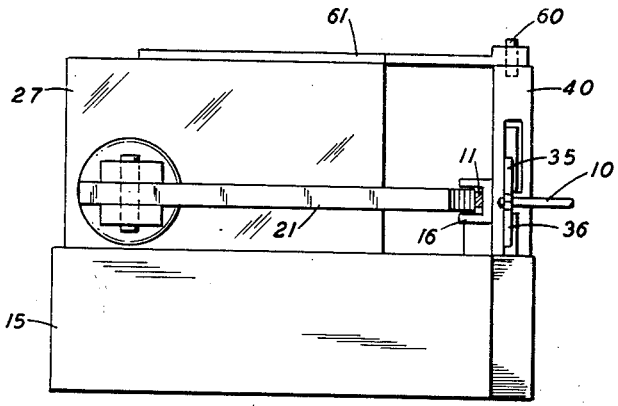
Fig. 5 is an enlarged end view of the device.
Figure 6:
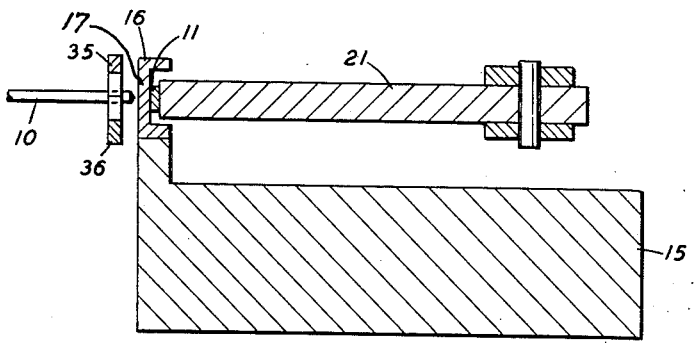
Fig. 6 is an enlarged cross-sectional view of the device taken along the line 6—6 of Fig. 3.
Figure 7:
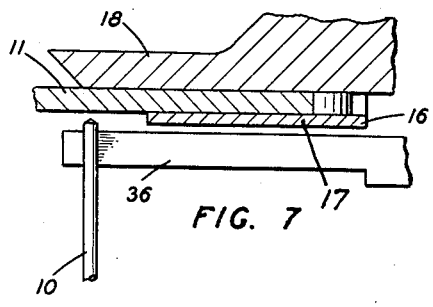
Fig. 7 is an enlarged fragmentary plan view of the terminal holder and the wire-gripping jaws with portions shown in section.
Figure 8:
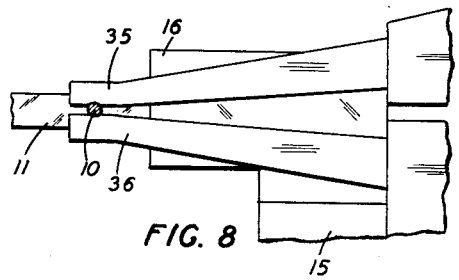
Fig. 8 is a front view of the wire-gripping jaws and terminal holder shown in Fig. 7.

The present device is designed to percussively weld wires 10 (Fig. 2) to terminals 11 by supporting the wire and terminal in a predetermined spaced relation to each other, applying a welding potential to the spaced wire and terminal and moving the wire into percussive engagement with the terminal. Referring to Figs. 1, 3 and 4, the device indicated generally by the numeral 14 comprises a base 15 preferably of dielectric material having a terminal holder or jaw 16 fixedly mounted thereon. The fixed holder 16 is channel shaped with the web 17 thereof vertically disposed for receiving a terminal 11 in engagement therewith to locate the terminal in a predetermined fixed position relative to the base and in which position the terminal is clamped by a terminal clamping jaw 18. A portion of the movable jaw 18 extends outwardly beyond the fixed holder 16 to support the terminal 11 against the impact of the wire 10 during the welding operation.

The terminal-clamping jaw 18 is in the form of a bell-crank lever mounted for oscillatable movement about a pivot pin 20 and having an arm 21 connected to a rod 22 of a piston reciprocable within a cylinder 24 of an air-operated actuator 25. The actuator 25 is supported in a mounting block 27 of insulating material on the base 15 and the piston of the actuator 25 is spring returned to a normal retracted position and is actuated in a forward direction by compressed air admitted into the cylinder 24 from a compressed air-supply line 28 under control of a valve 29.

The wire 10 is adapted to be gripped between a pair of wire-gripping jaws 35 and 36 formed on one end of a pair of levers 37 and 38 and having recessed seats for gripping and positioning the wire 10 in a predetermined location. The lever 38 rests on the base 15 and has a U-shaped member 40 with side walls fixed to the lever and extending upwardly therefrom for receiving the lever 37 therebetween. The lever 37 is supported on a pivot pin 41 on the member 40 for oscillatable movement relative to the lever 38 and a spring 42 interposed between the ends of the levers 37 and 38 stresses the lever 37 to move the wire-clamping jaw 35 into closed position to grip the wire against the jaw 36.

The lever 37 is moved in the opposite direction to open the jaw 35 by a member 45 positioned above the end of the lever 37 and extending laterally from an arm 46 of a U-shaped bail member 47 which has an intermediate portion 48 oscillatably supported in a bearing block 49 on the base 15 and has an upwardly extending arm 50. This arm 50 is pivotally connected to a piston rod 51 of a piston slidably mounted in a cylinder 53 of an air-operated actuator 54 which is supported in a mounting block 55 on the base 15. The piston of the actuator 54 is spring returned to a normal retracted position and is advanced by compressed air from the supply line 28 under control of a valve 57 to effect the movement of the bail 47 and the actuation of the upper movable wire-gripping jaw 35.

The lever 38 is provided with a trunnion 59 extending downwardly into a recess in the base 15 and the U-shaped member 40 surrounding the lever 38 is provided with an upwardly extending trunnion 60 rotatably supported in a bracket 61 secured to the mounting block 27 for supporting the levers 37 and 38 for oscillatable movement about a vertical axis to guide the wire-gripping jaws 35 and 36 and the wire 10 through a predetermined horizontal path into engagement with the terminal 11 supported in the holder 16. A spring 63 (Fig. 3) engageable with the end of the lever 38 stresses the levers for movement about the vertical axis through the trunnions 59 and 60.

A cam 65 slidably mounted on the base 15 is adapted to engage the end of the lever 38 and turn it about the vertical axis in a counter clockwise direction as viewed in Fig. 3 to a predetermined cocked position with the wire-gripping jaws 35 and 36 in predetermined spaced relation to the holder 16 and the terminal 10 therein. The cam 65 is connected to a piston rod 66 of a piston reciprocable within a cylinder 68 of an air-operated actuator 69 for reciprocating the cam 65. The piston is spring actuated to a normal retracted position and is moved in a forward direction by compressed air from the compressed-air supply line 28 under control of a valve 70 to effect the reciprocation of the cam 65. As shown more clearly in Fig. 1, the cam 65 is connected to the piston rod 66 by a curved connector arm 72, the vertically disposed portion of which is connected to a spring 73 which aids in returning the cam to its retracted position.

When the wire-gripping jaws 35 and 36 have been moved by the cam 65 to cocked position, they are latched in this position by a latch 76 (Fig. 3) which engages a catch 74 on the lever 38. The latch 76 is in the form of an irregularly shaped bar which is guided at one end for reciprocatory movement in a guide member 77 on the base 15 and which is connected at one end to a pivot pin 78 (Figs. 1 and 3) mounted on a lever 79 intermediate its ends. The lever 79 is supported on the base 15 in engagement with the vertically disposed portion of the connector arm 72 and is mounted for oscillatable movement about a pivot pin 81 positioned between the pivot pin 78 and the vertically disposed portion of the connector arm 72 of the cam 65. A spring 83 connected to the other end of the lever 79 and to the base 15 serves to yieldably maintain the lever in engagement with the connector arm 72 of the cam 65 and in cooperation with the arm 72 to impart reciprocatory movement to the latch 76.

The valves 29, 57 and 70 for controlling the flow of compressed air into the actuators 25, 54 and 69 are of the type having movable piston elements which are spring stressed to normal "off" positions and are actuated to "on" positions by solenoids 85, 86 and 87, respectively, in response to energization thereof. These solenoids 85, 86 and 87 are connected to a power line 88 in series with normally open switches 89, 90 and 91, respectively, which are closed for predetermined periods by any suitable means such as cams 92, 93 and 94 on a rotatable shaft 95 for effecting the sequential operation of the actuators during a cycle of operation of the device 14.

As shown diagrammatically in Fig. 1, means 97 connected by a conductor 98 to the member 40 of the wire-gripping jaws 35 and 36 and by a conductor 99 to the terminal-clamping jaw 18 is provided for impressing a welding potential to the wire 10 and the terminal 11 to effect the welding of them together during the movement of the wire into engagement with the terminal. The potential-supplying means 97 may be of a type having a capacitor capable of being charged to a predetermined voltage and then discharged through the wire and the terminal during the movement of the wire into engagement with the terminal.

The above-described welding device 14 which is also referred to as a welding gun comprises a component of an apparatus for automatically connecting wires to terminals 11 of electrical components 101 (Fig. 3) mounted on a panel 102, which apparatus is disclosed in co-pending application Serial No. 838,291, filed Sept. 4, 1959, entitled Automatic Wiring Machine.

The welding device 14 as disclosed in the above referred to co-pending application is capable of being reciprocated longitudinally in a first direction parallel to the terminals 11 on the panel 102 as indicated by the arrows 103 in Fig. 3 and of being reciprocated in a second direction indicated by arrows 104 transversely of said first direction into alignment with selected terminals so that the device may selectively be moved to a wire-loading position to permit the insertion and gripping of a wire 10 in the wire-gripping jaws 35 and 36 then moved laterally to predetermined positions with the terminal-gripping jaws 16, 18 in alignment with selected terminals, and then moved longitudinally into a terminal-gripping position to permit the gripping of the terminal 11 by the terminal-gripping jaws 16 and 18, after which the device 14 operates to effect the welding of the wire 10 to the terminal 11.

From the above description and an inspection of the drawings, it will be readily understood that the actuators 25, 54 and 69 are actuated in a predetermined sequence during the cycle of operation of securing a wire 10 to a terminal 11, and that in response to the forward actuation of the actuator 25, the movable terminal-gripping jaw 18 is actuated to clamp the terminal 11 against the stationary jaw 16 and in response to return actuation of the actuator 25, the movable jaw 18 is retracted to release the terminal 11; that in response to forward actuation of the actuator 69, the cam 65 is advanced to move the levers 38, 37 and the wire-gripping jaws 35, 36 to cocked position and to effect the latching of the levers in this position by the latch 76; that in response to forward actuation of the actuator 54, the bail 47 rocks the lever 37 to raise the wire-gripping jaw 35 to open position to permit the insertion of the wire 10 between the wire-gripping jaws 35 and 36, and that in response to return actuation of the actuator 54, the bail 47 is retracted to release the lever 37 and permit the spring 42 to move the jaw 35 to closed position to grip the wire against the jaw 36; and that in response to return actuation of the actuator 69, the cam 65 is retracted and disengages the lever 38, and the latch 76 is actuated to release the lever 38 and permit the spring 63 to rotate the levers 37, 38 about the vertical axis to cause the wire-gripping jaws 35 and 36 to move the wire 10 into percussive engagement with the terminal 11 during which movement of the wire 10 the impressed potential across the wire 10 and the terminal 11 creates an arc to effect the welding of the wire to the terminal.

It is to be understood that the above-described arrangements are simply illustrative of the application of this invention. Numerous other arrangements may be readily devised by those skilled in the art which will embody the principles of the invention and fall within the spirit and scope thereof.

What is claimed is:

1. In a device for welding wires to terminals, a movable base, a holder fixedly mounted on said base for positioning a terminal in a predetermined location, a movable jaw for clamping the terminal to the holder, a first pneumatic actuator mounted on said base for actuating said terminal clamping jaw, a pair of levers having wire-gripping jaws on one end thereof, means for mounting said levers on said base for oscillatable movement about a first axis intermediate the ends of the lever to guide the clamping jaws toward and from said terminal holder, means for mounting one of said levers for pivotal movement relative to the other about a second axis intermediate the ends of said one lever to guide the wire-gripping jaw thereon toward and from the other wire-gripping jaw, resilient means for stressing said one lever in one direction to move the wire-gripping jaw thereon toward the other to a closed position, a second pneumatic actuator on said base operatively connected to said one lever for moving said one lever in the opposite direction to open the wire-gripping jaws, resilient means for stressing said levers for movement about said first axis to move said jaws toward said holder, cam means slidably mounted on said base along a fixed path for moving said levers in the opposite direction to move said wire-gripping jaws from the holder to a predetermined cocked position, a third pneumatic actuator on said base for reciprocating said cam, latching means operable in response to the movement of said cam in one direction for latching said levers in cocked position and operable in response to movement of said cam in the opposite direction for releasing said levers to effect the movement of the wire into percussive engagement with the terminal, flexible conduit means connecting said pneumatic actuators individually to a source of compressed air, stationarily mounted valves associated with said conduit means for controlling the flow of compressed air to said pneumatic actuators, and control means for sequentially operating said valves to effect the sequential operation of said actuators.

2. In a device for welding wires to terminals, a movable base, a holder fixedly mounted on said base for positioning a terminal in a predetermined location, a bell crank lever pivotally mounted on said base and having a movable jaw for clamping the terminal to the holder, a first pneumatic actuator mounted on said base for actuating said bell crank lever, a pair of levers having wire-gripping jaws on one end thereof, means for mounting said levers on said base for oscillatable movement about a first axis intermediate the ends of the levers to guide the said wire gripping jaws toward and from said terminal holder, means for mounting one of said levers for pivotal movement relative to the other lever about a second axis intermediate the ends of said one lever to guide the wire-gripping jaw thereon toward and from the other wire-gripping jaw, resilient means for stressing said one lever in one direction to move the wire-gripping jaw thereon toward the other to a closed position, a second pneumatic actuator mounted on said base, a member supported on said base and pivotally connected to said second pneumatic actuator for pivoting said one lever in the opposite direction to open the wire-gripping jaws, resilient means for stressing said levers for pivotal movement about said first axis to move said wire-gripping jaws toward said holder, a third pneumatic actuator mounted on said base and having a plunger movable in forward and reverse directions, an actuating member connected to said plunger for forward and reverse movement therewith and operable in response to forward movement thereof for pivoting said levers about said first axis to move the wire-gripping jaws away from the holder to a predetermined cocked position, latching means operated by said actuating member in response to the forward movement thereof for latching said levers in cocked position and operable in response to reverse movement thereof for unlatching said levers to cause the wire-gripping jaws to move the wire into percussive engagement with the terminal, flexible conduit means connecting said pneumatic actuators individually to a source of compressed air, stationarily mounted valves associated with said conduit means for controlling the flow of compressed air to said pneumatic actuators, and control means for actuating said valves to effect the operation of said actuators in a predetermined sequence.

References Cited in the file of this patent
UNITED STATES PATENTS

| | | |
|---|---|---|
| 2,878,362 | Quinlan | Mar. 17, 1959 |
| 2,921,177 | Gellatly et al. | Jan. 12, 1960 |